July 15, 1941.    R. ALKAN    2,249,373
DIRECTIONAL GYROSCOPE
Filed Dec. 9, 1937
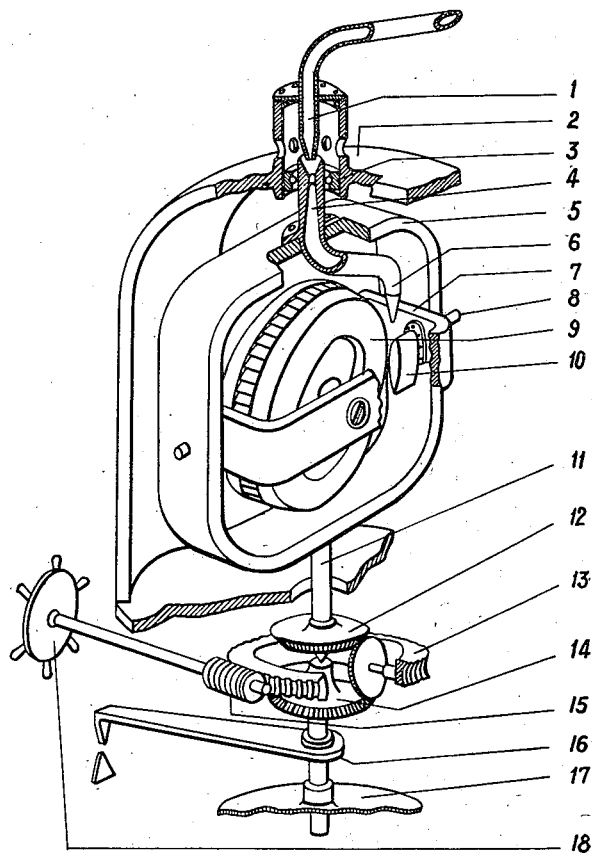
Robert Alkan
Inventor
by Stephen Cerstvik
Att'y Patented July 15, 1941

2,249,373

UNITED STATES PATENT OFFICE 2,249,373

DIRECTIONAL GYROSCOPE

Robert Alkan, Paris, France

Application December 9, 1937, Serial No. 179,029
In France December 11, 1936

5 Claims. (Cl. 33—204)

This invention relates to indicating and/or controlling devices, and more particularly to directional gyroscopes used on dirigible crafts as directional indicators and/or as controlling devices for automatic steering systems of the same.

In hitherto known directional gyroscopes used as directional indicators and/or as control devices in automatic steering systems of dirigible crafts, one has been faced with certain problems such as: adjustment of the gyroscopic indicator for a desired course or resetting of the same for compensating the errors due to the gyroscopic precession, stabilizing of the axis of rotation of the gyroscope in a practically horizontal position, reduction of air and friction loss when the drive of the gyroscope is produced by compressed air supplied to the gyroscopic rotor through air passages in the suspension bearings of the same.

The present invention seeks to provide improved solutions for said problems and, with this object in view, one of its features resides in the provision of an improved directional gyroscope for indicating and/or controlling action, in which means actuated by the gyroscope for indicating and/or controlling action are connected with the gyroscope through a differential gear mechanism in such a way that said indicating and/or controlling means may be conveniently adjusted or reset in a quantitative and precise manner relative to the gyroscope without modifying or disturbing the position of the same while avoiding an interruption of the positive engagement between said controlled means and the gyroscope.

Another feature of the invention resides in the provision of an improved directional gyroscope adapted for indicating and/or controlling action in which the maintenance of the axis of rotation of the gyroscopic rotor in an horizontal plane is insured by causing an air jet to act on a deflector element secured on the horizontal gimbal frame of the gyroscope suspension so that said element is angularly rotatable with said frame about the horizontal axis of its suspension.

A further feature of the invention resides in the provision of an improved directional gyroscope of the kind specified in which the maintenance of the axis of rotation of the gyroscopic rotor in an horizontal plane is effected by an air jet acting on a deflector element carried by the horizontal gimbal frame of the gyroscope suspension and in which this deflector element is given such a profile that during normal movements of the gyroscope, the aerodynamic resultant force of the air jet always passes in the very vicinity of the horizontal axis of the gyroscope suspension, so as to reduce the perturbating moment to a negligible value, while creating an important moment with respect to the vertical axis of the gyroscope suspension effective to cause, upon an inclination of the axis of rotation of the gyroscope from its horizontal position, a corrective precession.

A further feature of the invention resides in the provision of an improved directional gyroscope in which the horizontality of the axis of rotation of the gyroscope is insured by using a fraction of the air jet insuring the rotation of the gyroscope.

A still further feature of the invention resides in the provision of an improved directional gyroscope for indicating and/or controlling action in which the drive of the gyroscope is insured by a jet of compressed fluid, such as air, supplied to the gyroscopic rotor through an air passage in a bearing of the gimbal suspension of the gyroscope, said air supply means comprising an air injector formed of an inlet nozzle and a discharge nozzle of which the former is made as a trunnion of the suspension of the gyroscope and which thus possesses a degree of liberty for rotation about its axis, whilst the latter is arranged coaxially to said trunnion, and is secured to the bearing of said trunnion so that a comparatively important annular play is left between the two nozzles.

The above and other features of the invention will appear more fully from the following detailed description and the annexed drawing, showing one form of the embodiment of the invention, it being understood that the invention is not to be limited to the form of embodiment illustrated and described but may be reproduced in different other mechanical forms without departing from the spirit of the invention.

The single figure of the drawing shows a perspective view, partially in section, of a form of embodiment of an improved directional gyroscope according to the invention.

In this figure, a gyroscope formed by a rotor 9 provided at its periphery with buckets serving to maintain its rotation under the action of a jet of compressed fluid, such as air, is rotatably mounted in an horizontal frame 7, which is pivotally mounted by means of trunnions, such as 8, and corresponding anti-friction bearings (not shown) receiving the same, for rotation about an horizontal axis in a second frame 5, which in its turn is pivotally mounted by means of trunnions 4 and 11 and corresponding antifriction bearings such as 3, receiving the same, for rotation about a vertical axis maintained stationary in the craft.

According to the invention, the air jet driving the gyroscope is produced by a nozzle 6, which is rigidly secured to the vertical gimbal frame 5 of the gyro suspension, so as to rotate with said frame about its vertical axis. The motive fluid or air is supplied to said nozzle through one of the trunnions 4 or 11 of said vertical gimbal frame 5, for instance the trunnion 4, which is made hollow to provide a passage for the air supply to the nozzle 6 directing an air jet substantially tangentially to the periphery of the gyroscopic rotor. In order to avoid unnecessary losses of motive fluid and to reduce to a minimum the friction of a trunnion or trunnions serving for the introduction of motive fluid to the gyroscopic wheel, such a trunnion while being as usual mounted in an anti-friction bearing, such as ball bearing 3, is recessed axially to form an inlet nozzle, which is thus rotatable with the vertical gimbal frame of the gyro suspension. This inlet nozzle is adapted to cooperate with a stationary injection or discharge nozzle 1 located above said inlet nozzle coaxially thereto, without a material contact with this latter, and, namely, so that an appreciable annular play is left between the two nozzles. The injection or discharge nozzle 1 is supplied with compressor air (or, which is the same thing, the whole apparatus is submitted to the action of a partial vacuum, with the exception of the supply for the discharge nozzle 1).

The air jet coming out of the discharge nozzle 1 expands in the inlet nozzle 4 and creates around the entrance of said inlet nozzle a certain suction causing a rush of outside air into said nozzle 4. Thus, the air or fluid which maintains the rotation of the gyroscope is supplied to the nozzle 6 through the axis of the suspension of the gyroscope without any loss of air, since in the vicinity of the trunnion 4 the air tends to enter into the nozzle and not to escape therefrom, and also without introducing any friction other than the normal friction of a trunnion journalled in an antifriction bearing.

Rigidly fixed to the frame 7 and coaxially with the trunnion 8 is a deflector element 10 formed by a vane having a symmetrical profile similar to the profile of an airplane wing. This deflector element 10 is located so as to be acted upon by a portion of the jet of the nozzle 6 in such a manner that, upon inclination of the frame 7 about the horizontal axis of trunnion 8, the air jet produces on this deflector element a reaction force the moment of which about the vertical axis of the trunnions 4 and 11 is effective to cause a precession of the gyroscope in a direction which tends to correct the inclination of the frame 7 which has caused this precession.

More particularly, the deflector element 10 is given such a profile that the position of the center of the air thrust varies very slightly as a function of the angle of incidence thereof with respect to the direction of the air jet. Furthermore, the deflector element is so arranged that the thrust center practically coincides with the axis of the horizontal trunnions 8. In this matter, the perturbating moment of the reaction of the deflector element with respect to the horizontal axis of the trunnions 8 (which moment would have for its effect to cause a parasitical precession about the vertical axis of the trunnions 4 and 11) is rendered negligible, while the moments of the reaction of the deflector element with respect to the vertical axis which produces the correcting precession is given a maximum value.

As it is well known, in order to obtain from a directional gyroscope an indicating and/or controlling action, the vertical gimbal frame of the suspension of the gyroscope or the vertical axis of said frame is connected with or carries an indicating and/or controlling means, the movement of which relative to the casing enclosing the whole gyroscope and its suspension gives the desired indicating and/or controlling action.

In accordance with the present invention, such indicating and/or controlling members are not directly connected to the vertical frame or axis of suspension of the gyroscope but through a differential gear mechanism adapted to be controlled from the outside of the casing enclosing the whole gyroscope, which differential mechanism permits to produce angular adjustment of said indicating and/or controlling members relative to the gyroscope without interrupting the positive mechanical connection of such members with the gyroscope and without disturbing the position of this latter.

In the present instance, as shown in the drawing, the gyroscope is adapted to actuate in this way an indicator in the form of an index 16 and a control member 17, which latter may be in the form of a disc controlling two oppositely arranged orifices of a control arrangement of an automatic steering system, such as disclosed in the applicant's co-pending application No. 161,863 filed August 31, 1937. The differential gear mechanism is constituted by a primary pinion 12 secured at the extremity of the lower trunnion 11 of the vertical gimbal ring of the suspension of the gyroscope and a secondary pinion 14 fixed on the shaft carrying the controlled members, such as index 16 and control disc 17, which shaft is arranged in alignment with the trunnion 11 carrying the primary pinion 12. These primary and secondary pinions 12 and 14 are interconnected by means of one or more intermediary planetary pinions carried by a planetary ring 13 journalled for rotation, between said primary and secondary pinions, about a common axis of the trunnion 11 and the shaft carrying the secondary pinion 14, and formed on its periphery with a worm gear meshing with a worm 15 adapted to be actuated directly or at a distance by means of a small control wheel 18.

Due to the fact that the differential gear is directly connected to the sensitive element of the directional gyroscope, namely, the vertical frame of the gimbal suspension of the gyroscope, the planetary pinions forming this mechanism must be pivoted with great care in order to reduce to a minimum any frictional resistances which, if present, cause perturbating precession movements of the gyroscope.

It will be appreciated thus that this construction permits to effect quantitatively in a precise and convenient manner, either by hand or automatically, if desired, relative angular adjustment of a member or members controlled by the gyroscope, adjustments which are necessary for the correction of occasional precessions of the gyroscope or for introduction of voluntary variations between the gyroscope proper, the direction of which remains arbitrary, and the members which must have a predetermined direction.

The planetary differential gear system is effective thus, on one hand to transmit normal angular movement of the directional gyroscope to its controlled members and also to adjust these controlled members relative to the gyroscope at the will of the operator for changing the course or compensating the precession of the gyroscope and this without interrupting the positive connection between these controlled members and the gyroscope and without disturbing the position of the same.

What I claim is:

1. An improved directional gyroscopic device comprising an azimuth direction keeping gyroscope, means adapted to be controlled by said gyroscope for indicating and/or controlling action, and means for adjusting said gyroscope controlled means relative to the gyroscope, said means comprising a differential gear mechanism inserted in the driving connection between the gyroscope and said gyroscope controlled means and continuously mechanically directly connecting said gyroscope to said controlled means whereby said latter means may be conveniently adjusted or reset in a quantitative manner relative to the gyroscope without disturbing the position of said gyroscope while maintaining uninterrupted positive driving connection between said gyroscope and its said controlled means.

2. A directional gyroscopic device comprising an azimuth direction keeping gyroscope, means controlled by said gyroscope and means for adjusting said controlled means relative to said gyroscope to set a predetermined course without disturbing the position of the gyroscope while maintaining a continuous connection between the gyroscope and controlled means, said means comprising a first pinion integrally connected to said gyroscope, a second pinion integrally connected with said controlled means, a planetary system interconnecting said pinions and means for adjusting said planetary system whereby relative movement between said controlled means and gyroscope is obtained.

3. In a direction indicating device, a directional gyroscope mounted for movement in azimuth, a controlled movable member, a shaft carried by said gyroscope, transmission means directly connecting said shaft to said movable member and adapted to actuate said movable member in accordance with the movement of said gyroscope, and means drivably engaging said transmission means for actuating said movable member independently of said gyroscope.

4. In a direction indicating device comprising a directional gyroscope having a gyro rotor mounted for spinning about a horizontal axis, a vertical ring provided with trunnions mounted for angular movement about a vertical axis, a second ring perpendicular to said vertical ring mounted for angular movement within the latter carrying said rotor, a controlled movable member, transmission means connected directly to one of said trunnions and to said movable member and adapted to actuate said movable member in accordance with the movement of said gyroscope, and means drivably engaging said transmission means for actuating said movable member independently of said gyro.

5. An improved directional gyroscopic device comprising an azimuth direction keeping gyroscope, means adapted to be controlled by the gyroscope for indicating and/or controlling action, a shaft carried by said gyroscope, means connecting said shaft directly to said controlled means, and means operatively connected to said connecting means for adjusting said gyroscope controlled means relative to the gyroscope to set a predetermined course without disturbing the position of the gyroscope while maintaining uninterrupted positive mechanical driving connection between the gyroscope and its said controlled means.

ROBERT ALKAN.